(12) United States Patent
Hobson et al.

(10) Patent No.: US 8,990,320 B2
(45) Date of Patent: Mar. 24, 2015

(54) METHOD, APPARATUS AND COMPUTER PROGRAM FOR MESSAGE HANDLING

(75) Inventors: Stephen James Hobson, Winchester (GB); Jose Emir Garza, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 13/112,957

(22) Filed: May 20, 2011

(65) Prior Publication Data

US 2011/0289165 A1    Nov. 24, 2011

(30) Foreign Application Priority Data

May 20, 2010    (EP) .................................. 10163384

(51) Int. Cl.
    *G06F 9/54*    (2006.01)

(52) U.S. Cl.
    CPC .................................... *G06F 9/546* (2013.01)
    USPC ........................... 709/206; 709/225; 709/232

(58) Field of Classification Search
    CPC ....... H04L 12/585; H04L 12/58; H04L 29/06; H04L 29/08072; H04L 29/0809; H04L 47/10
    USPC ........................................ 709/206, 225, 232
    See application file for complete search history.

(56) References Cited

U.S. PATENT DOCUMENTS

| | | | |
|---|---|---|---|
| 5,903,557 A * | 5/1999 | Johansson et al. | 370/349 |
| 7,546,367 B2 * | 6/2009 | Mahdavi | 709/224 |
| 2003/0233466 A1 * | 12/2003 | Kinkade | 709/232 |

* cited by examiner

*Primary Examiner* — Un C Cho
*Assistant Examiner* — Natali N Pascual Peguero
(74) *Attorney, Agent, or Firm* — Grasso PLLC; Fred Grasso

(57) ABSTRACT

A method, apparatus and computer program are disclosed for refusing to process messages from a sender at a queue manager associated with a receiver when the receiver is inactive. It is identified whether a first destination has been selected. This first destination provides an indication of whether the receiver is active. If a first destination has been selected, it is determined using this first destination whether the receiver is active. If the receiver is inactive, the queue manager refuses to process messages intended for the receipt by the receiver.

27 Claims, 3 Drawing Sheets

US 8,990,320 B2

METHOD, APPARATUS AND COMPUTER PROGRAM FOR MESSAGE HANDLING

FIELD OF THE INVENTION

The invention relates to message processing and more particularly to a message consumer becoming inactive.

BACKGROUND OF THE INVENTION

A popular configuration for Message-oriented-Middleware (MoM) is to collocate a queue manager with each instance of a client or server. In this context, a client or a server could be a single message-consuming application but could equally be a platform that runs multiple different applications, some or all of which use the MoM; examples include IBM® CICS®, IMS™; WebSphere® Message Broker and WebSphere Application Server (WAS). (IBM, CICS, IMS and WebSphere are trademarks or registered trademarks of International Business Machines Corporation in the United States, other countries, or both.)

Collocation of a queue manager with each client/server in this way is often chosen because it allows a sender to continue using the MoM even when a receiver's communication is temporarily unavailable; it may also be chosen as a way to provide greater MoM capacity, or for other reasons.

A potential problem with this collocation happens when the receiver (i.e., client or server) is inactive whilst its collocated queue manager is active. This can happen, for example, during start-up when the queue manager start-up completes much more quickly than the receiver start-up, or if the receiver suffers a software failure which does not causes a queue manager outage. In this situation the MoM, typically continues to deliver messages to the queue manager while the receiver is inactive. This is sometimes undesirable, especially where the receivers are servers that are clustered so that the preferred behaviour is for the MoM to deliver messages to queue managers collocated, with active receivers and not to queue managers collocated with inactive receivers.

SUMMARY OF THE INVENTION

According to a first aspect, there is provided a method for refusing to process messages from a sender at a queue manager associated with a receiver when the receiver is inactive, the method comprising: identifying whether a first destination has been selected, the first destination providing an indication of whether the receiver is active; responsive to identifying that the first destination has been selected, determining using the first destination whether the receiver is active; responsive to determining that the receiver is inactive, refusing to process messages at a second destination, wherein messages at the second destination are intended for the receipt by the receiver.

Refusing to process messages at a second destination, may mean that the queue manager does not even accept any messages, for that second destination. It may alternatively mean that it recognizes that a message is for the second destination and routes that message elsewhere. Another possibility is that the message is accepted at the second destination but not allowed to remain at that second destination; in other words is rerouted. Messages therefore, preferably do not build up at the second destination when the receiver receiving messages from that second destination is inactive.

Determining whether the receiver is active, may be performed periodically.

"Associated with" may mean "collocated with".

In a preferred embodiment, in order to determine whether the receiver is active, it is determined whether the first destination is open for input.

In one embodiment, the receiver is a server associated with the queue manager.

In one embodiment, the receiver is a receiving application.

In one embodiment, an administrator is able to select the first destination.

In another embodiment, an indication is received from the receiver as to which first destination should be selected and the first destination is then selected based on the received indication. For example, the receiver might indicate that the receiver is a particular type of server (and then the appropriate destination can be deduced) or an actual destination might be suggested.

In one embodiment, responsive to determining that the receiver is inactive, informing a queue manager responsible for forwarding messages from the sender and destined for the receiver that said forwarding queue manager should refrain from sending said messages destined for the receiver (i.e. messages destined for the second destination.) The sending queue manager can then be informed when said forwarding queue manager can continue sending messages destined for the receiver.

In one embodiment, responsive to determining that the receiver is inactive, informing a queue manager responsible for forwarding messages from the sender and destined for the receiver that said forwarding queue manager should refrain from sending said messages for a period of time.

In one embodiment, refusing to process messages means disconnecting from a connection to a queue manager responsible for forwarding messages from the sender and destined for the receiver.

In one, embodiment, one queue manager is associated with multiple receivers.

Each receiver may have a separate destination selected, each destination providing an indication of whether that receiver is active.

According to a second aspect, there is provided an apparatus for refusing to process messages from a sender at a queue manager collocated with a receiver when the receiver is inactive, the method comprising: means for identifying whether a first destination has been selected, the first destination providing an indication of whether the receiver is active; means, responsive to identifying that the first destination has been selected, for determining using the first destination whether the receiver is active; means, responsive to determining that the receiver is inactive, for refusing to process messages at a second destination, wherein messages at the second destination are intended for the receipt by the receiver.

The invention may be implemented in a computer-readable storage device having encoded thereon program steps for performing the method of the invention.

BRIEF DESCRIPTION OF THE DRAWINGS

A preferred embodiment of the present invention will now be described, by way of example only, and with reference to the following drawings.

DETAILED DESCRIPTION

Figure 1:
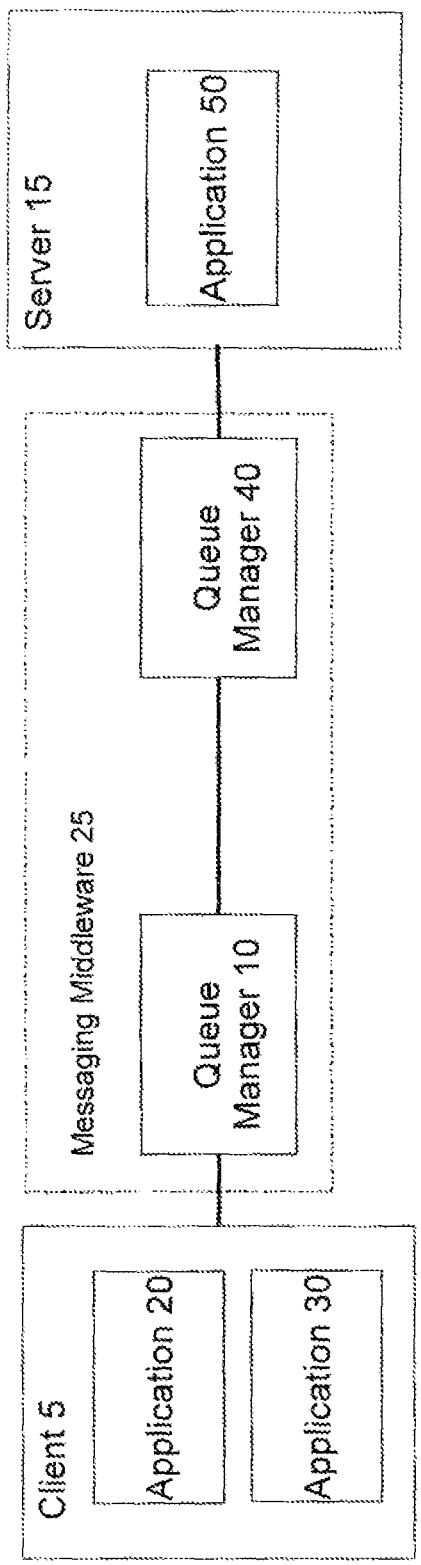
FIG. 1 is a block diagram illustrating a computer system in which the present invention, in accordance with an embodiment of the present invention, may operate.

FIG. 1 illustrates a computer system in which the present invention, in accordance with a preferred embodiment, may operate. A client computer 5 comprises a plurality of applications 20, 30. The applications 20, 30 are stored on a memory (not shown) and executed by a processor (not shown in operative association with the memory. One of the client applications 20 requests that an application 50 on a server computer 15 carry out some work on behalf of the client. The application 50 is stored on a memory (not shown) and executed by a processor (not shown) in operative association with the memory.

Communication between the client 5 and the server 15 occurs using messaging Middleware 25. Messaging middleware (for example, IBM's WebSphere MQ product) comprises a queue manager 10 collocated with the client 5 and a queue manager 40 collocated with the server 15. Messages are sent by a sending application (e.g. application 20) to one queue manager 10, transmitted to the other queue manager 40 and then retrieved by a receiving application (e.g. application 50).

Each queue manager comprises program instructions stored on a memory (not shown) and executed by a processor (not shown). The memories and processors may be the same memories and processors of the respective client and server or may be separate memories and processors.

As alluded to previously, a problem can occur when the receiving server 15 is unable to retrieve messages from its collocated queue manager 40. This might be because an application hosted by the server fails or because the server itself fails. Either situation can cause a problem because the queue manager 40 may be unaware of such a failure and will continue to receive messages from queue manager 10 which are ultimately destined for server 15.

There are various possible partial solutions to this problem. One partial solution is to set a maximum queue depth. This has disadvantages that include that it can be difficult to choose a good value. Note that the queueing mechanism is intended to allow messages to build up during transient periods of heavy load (but not when a server is actually down). It may be some time before a queue hits its maximum and the receiver may already have been down for some time. Also, with some message systems, the maximum queue depth only works when there is no dead-letter queue. This is not always, satisfactory. For example, customer may want incorrectly formatted or addressed messages to be put on the dead-letter queue. The maximum queue depth only works when there is no dead-letter, queue because otherwise messages may get delivered to the dead-letter queue simply because the main queue is full. This doesn't provide an indication to the queue manager that the receiving application is down.

Another partial solution is to use a script (or other automation) that health-checks the server and activates or deactivates the queue manager accordingly. (IBM WebSphere Application Server provides heart beat technology which could be used perform such health-checks.) This has disadvantages that include that sophisticated health checks are typically both complex and very specific to the server type and may require custom code. A simple and general solution is preferred. Also, it is preferable to avoid forcing the customer to develop scripts or other automation technology. An out-of-the-box solution is preferred.

Figure 2:
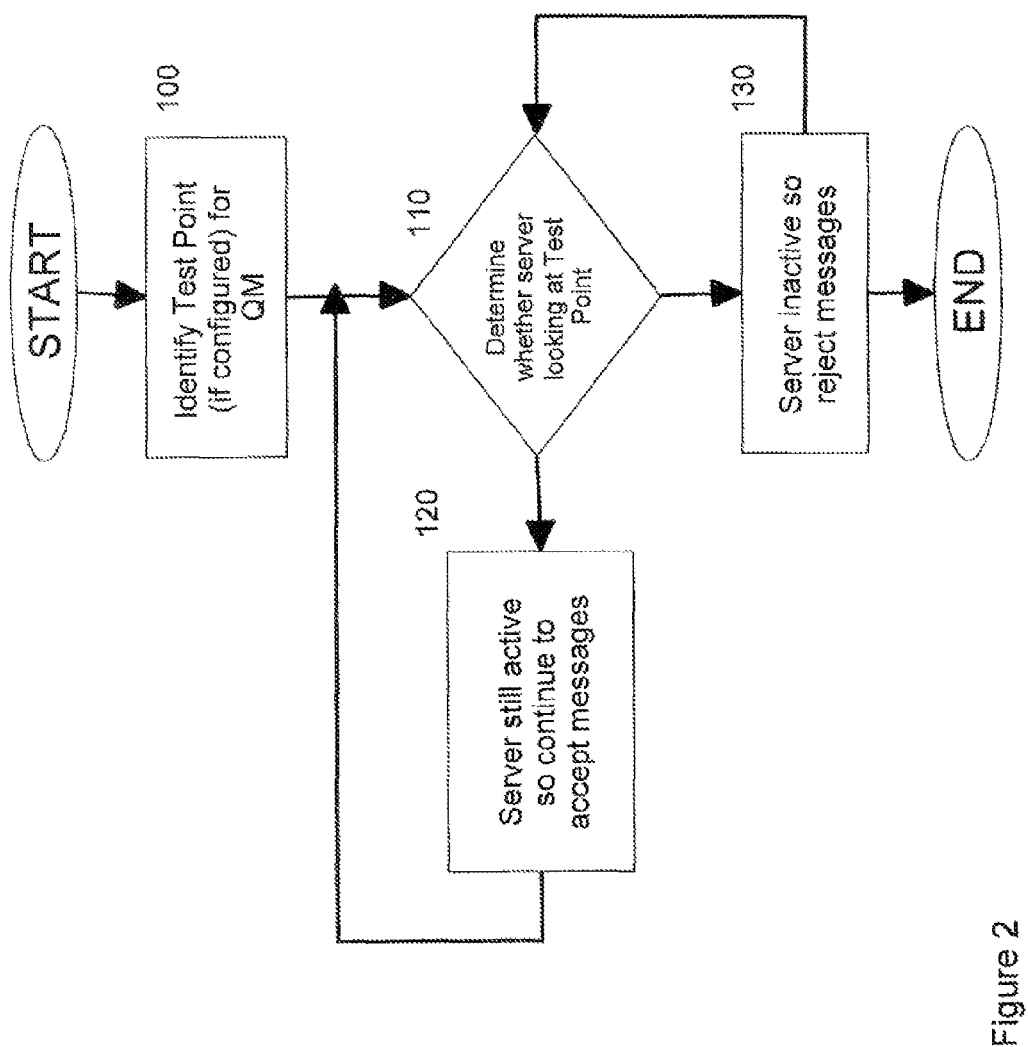
FIG. 2 is a flow diagram of a method for refusing to process messages from a sender at a queue manager associated with a receiver when the receiver is inactive in accordance with an embodiment of the present invention.
Figure 3:
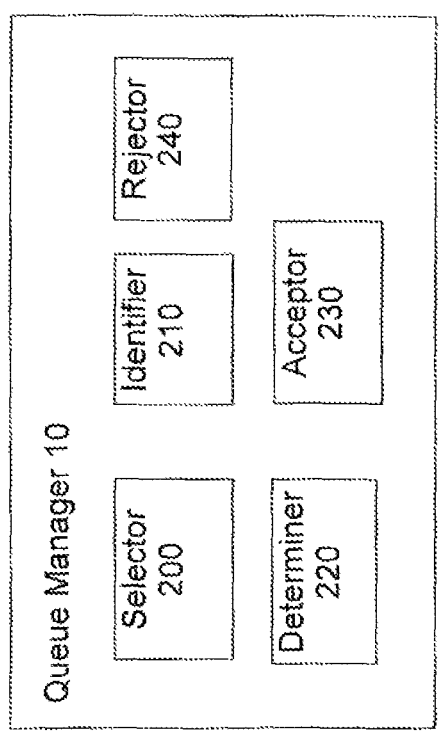
FIG. 3 is a block diagram showing logical components of a computer system in accordance with an embodiment of the present invention.

This problem is addressed as described hereunder with reference to FIGS. 2 and 3 which should be read in conjunction with one another.

An administrator of the messaging middleware is now able to select (using selector component 200) a "test point" destination. This could be a queue, publish/subscribe topic (if the queue manager supports pub/sub) or other destination. The administrator knows which server(s) is collocated with the queue manager and selects a queue for which they know there is a high likelihood that when the server is active, the server will, be using that queue. In other words, the administrator selects a queue which should be open for input when the server is active. In general, this will be an existing destination so that no changes are required to the server, configuration. By way of example, this might be the control queue for IBM's WebSphere Message. Broker product or the CICS bridge input queue for IBM CICS.

A test point is identified (if configured) by the identifier component 210 at step 100. The queue manager then periodically determines at step 1 to whether the server is looking at the test point using the determiner component 220; it is already possible for a queue manager to determine whether a queue is open for input (e.g. using the IPPROCS attribute in WebSphere MQ) and thus the queue manager is able to determine whether the server has this test point "open" in order that messages may be put to and got from that test point. In terms of the period at which a determination is made at step 110, every tenth of a second might be acceptable. The period depends on how quickly the system is expected to notice that there is a problem and how long one would expect it to fake to restart the server. If thousands of messages a second are being sent, then a thousandth of a second or less might be better. It would also be possible to have, the queue manager monitor the message rate and determine a sensible default interval itself.

If there is a "test point" destination configured, then the queue manager rejects messages (Rejector component 240) when the "test point" destination is not open for input (step 130) and accepts messages (Acceptor component 230) when the "test point" destination is open for input (step 120).

One way of rejecting messages is for the server queue manager 40 to break its connection with the client queue manager 10. This may be achieved, for example, by disconnecting from the incoming tcpip socket. If the messaging middleware is WebSphere MQ then the receiver channel state (stopped or started) is preferably modified to break and re-connect the client and server queue managers. Other methods are possible, for example, by preventing messages from being put to a queue (e.g. Put-Inhibited state in WebSphere MQ), but using the channel protocol to disconnect and re-connect the channel is simple to implement without requiring any significant new capabilities or protocols to be implemented, it also allows queue managers which implement the solution disclosed to exploit the solution whilst coexisting with legacy queue managers.

It would equally be possible for queue managers that are rejecting messages to indicate to the sending queue manager that they should try again later (perhaps after a specific interval) or for the receiving queue manager to indicate when it is ready to accept messages again.

Whilst the use of only one test point per server has been discussed, it would be possible for each application hosted by the server to have its own test point. In this instance, each application would have its own set of queues. Thus it would be necessary to configure the middleware system in such a way that only access to a particular subset of queues is disabled. In WebSphere MQ, for example, it is possible to configure a queue manager such that there is a channel, per subset of queues rather than one channel per queue manager.

In the example given, there might still be a test point for the server as a whole. Configuration of a test point per application would mean that the queue manager would be able to tell when an individual application is no longer receiving messages.

In one embodiment, there is a single queue manager collocated with multiple servers. In this example, each server has a separate receiving channel such that it is possible to disable access to a particular channel in the event of a problem with the relevant server.

It should be appreciated that whilst the present application is described in terms of a test point configured with respect to the server's collocated queue manager, it would equally be possible to configure a test point for the client's collocated queue manager (e.g. if messages were flowing in the direction of the client.)

It should further be appreciated that although test points are described as being configured manually by an administrator, some level of automation would be possible. For example, the server may inform the queue manger that it is of a particular type and a lookup table may then be used to determine an appropriate queue to act as a test point. Alternatively, the server may indicate to the queue manager which queue it should configure as a test point It should additionally be appreciated that whilst the present invention has been described in terms of a queue manager and queues. The term "queue manager" is meant to cover any message routing component with the functionality to store messages before transmitting them to a receiver asynchronously. Queues are also not the only option, but rather any message destination such as a pub/sub topic.

Further, whilst a queue manager will typically be collocated with a client (as shown in FIG. 1), the server queue manager may not communicate directly with the client queue manager. There may be an additional queue manager in between the server and client queue managers and the additional queue manager may, for example, be told to stop sending messages. That additional queue manager may then reroute messages intended for the inactive receiver elsewhere.

It should be appreciated that a queue manager which is collocated with a server may, have the choice of several servers and could then choose not to queue messages for a server that is inactive.

The specification indicates that a queue manager is collocated with a client or a server. This may mean located within the same machine. However collocation is not intended to be a limitation of the present invention and a queue manager may simply be associated with a sender or receiver.

It should be appreciated that one test point may be used to determine whether to accept messages onto any queue within a set of queues managed by the queue manager. The set may be all queues managed by that queue manager.

The present invention may be implemented by hardware or by combinations of hardware and software. The present invention may be implemented in a computer system in a collective or distributive manner, where in the distributive manner, different parts may be distributed in a plurality of interconnected computers. Any computer system or other apparatus suitable for implementing the method as depicted herein is suitable. A typical combination of hardware and software may be a general purpose computer system with a processor, memory, and a computer program. When the program is loaded onto the memory and executed by the processor, it controls the computer system to implement the method of the present invention and constitute the apparatus of the present invention.

The present invention may also be embodied in the computer program product which comprises a tangible computer-readable storage medium with program instructions encoded thereon comprising all features capable of implementing the method as depicted herein and may implement the method when loaded to the computer system.

Although the present invention has been specifically illustrated and explained with reference to the preferred embodiments, those skilled in the art should understand various changes thereto in form and details may be made without departing from the spirit and scope of the present invention.

The invention claimed is:

1. A method for refraining from processing messages from a sender at a queue manager associated with a receiver when the receiver is inactive, the method comprising:
    a receiving queue manager identifying whether a first intermediary destination has been previously selected as a status test-point for a receiver destined for messages from an originating sender, the originating sender separated by a network from the receiving queue manager, the first intermediary destination providing an indication for use by the receiving queue manager of whether the receiver, which receives messages destined for it from the originating sender, is active and accepting messages or inactive and not accepting messages;
    responsive to identifying that the first intermediary destination has been selected as a test-point, the receiving queue manager determining, using the first intermediary destination as a test-point, whether the receiver is active or inactive, the determination including testing the first intermediary destination over an active and functioning network connection, to determine when the receiver is open for input and accepting messages and when the receiver is not open for input and accepting messages;
    responsive to determining, using the first intermediary destination as a test-point that the receiver is inactive, the receiving queue manager refusing to process messages at a second intermediary destination, wherein messages at the second intermediary destination are destined for receipt by the receiver.

2. The method of claim 1, wherein testing is over an active and functioning network connection with the receiving queue manager, and wherein the first intermediary destination and the second intermediary destination employ the same configuration.

3. The method of claim 1, wherein the receiver is a server collocated with the receiving queue manager.

4. The method of claim 1, wherein the first intermediary destination is selected as a test-point by an administrator and wherein the first intermediary destination is a queue known to be open for input when the receiver, a server, is active.

5. The method of claim 1, further comprising:
    the receiving queue manager enabling an administrator to select the first intermediary destination and wherein the first intermediary destination may comprise:
    a queue or a publish/subscribe topic, the queue open for input when the receiver, a server, is active.

6. The method of claim 1, further comprising:
    the receiving queue manager receiving an indication from the receiver as to which first intermediary destination should be selected; and
    the receiving queue manager selecting the first intermediary destination based on the received indication.

7. The method of claim 1, wherein:
responsive to determining that the receiver is inactive, the receiving queue manager informing a sending queue manager responsible for forwarding messages from the sender and destined for the receiver that the sending queue manager should refrain from sending said messages destined for the receiver.

8. The method of claim 1, wherein:
responsive to determining that the receiver is inactive, the receiving queue manager informing a sending queue manager responsible for forwarding messages from the sender and destined for the receiver that the sending queue manager should refrain from sending said messages for a period of time.

9. The method of claim 7, further comprising:
the receiving queue manager informing the sending queue manager when the sending queue manager can continue sending messages destined for the receiver.

10. The method of claim 1, wherein the step of refraining from processing messages comprises:
disconnecting from a tcp/ip socket connection to the the receiver.

11. The method of claim 1, wherein the queue manager is associated with multiple receivers.

12. The method of claim 11, wherein each receiver has a separate test-point destination selected, each test-point destination providing an indication of whether that particular receiver associated with the specific test-point is active.

13. The method of claim 1, wherein the step of determining, using the first intermediary destination, whether the receiver is active is performed periodically and includes testing a test point at the first intermediary destination, the test point indicating if a receiver is open or not open for input.

14. A computer system for refraining from processing messages from a sender at a queue manager associated with a receiver when the receiver is inactive, the computer system comprising:
at least one memory;
at least one processor operably connected with the memory;
program instructions stored on the memory and executable by the processor, comprising:
program instructions for identifying whether a first intermediary destination for a first queue manager has been previously selected as a test-point for a receiver associated with the first queue manager, the first intermediary destination serving as a test-point for the active/inactive status of the receiver by providing an indication of whether the receiver targeted for receipt of messages from the first intermediary destination is active;
program instructions for, responsive to identifying that the first intermediary destination has been selected as a test-point indicative of the active/inactive status of the receiver, determining using the first intermediary destination whether the receiver is active or inactive, the determination including testing the first intermediary destination, using an established and functioning network connection to determine when the receiver is open for input and accepting messages and when the receiver is not open for input and accepting messages;
program instructions for, responsive to determining using the first intermediary destination, that the receiver is inactive, refusing to process messages at a second intermediary destination for the first queue manager, wherein messages at the second intermediary destination are intended for the receipt by the receiver.

15. The computer system of claim 14, wherein the program instructions for determining whether the receiver is active comprise:
program instructions stored on the memory and executable by the processor for determining whether the first intermediary destination is open for input.

16. The computer system of claim 14, wherein the receiver is a server associated with the first queue manager.

17. The computer system of claim 14, wherein the receiver is a receiving application.

18. The computer system of claim 14, further comprising:
program instructions stored on the memory and executable by the processor for enabling an administrator to select the first intermediary destination.

19. The computer system of claim 14, further comprising:
program instructions stored on the memory and executable by the processor for receiving an indication from the receiver usable for selecting the first intermediary destination; and
program instructions stored on the memory and executable by the processor for selecting the first intermediary destination based on the received indication.

20. The computer system of claim 14, further comprising:
program instructions stored on the memory and executable by the processor for, responsive to determining that the receiver is inactive, informing a second queue manager responsible for forwarding messages from the sender and destined for the receiver that said second queue manager should refrain from sending said messages destined for the receiver.

21. The computer system of claim 14, further comprising:
program instructions stored on the memory and executable by the processor for, responsive to determining that the receiver is inactive, informing a second queue manager responsible for forwarding messages from the sender and destined for the receiver that said second queue manager should refrain from sending said messages for a period of time.

22. The computer system of claim 20, further comprising:
program instructions stored on the memory and executable by the processor for informing the second queue manager when said first queue manager can continue sending messages destined for the receiver.

23. The computer system of claim 14, wherein the program instructions for refusing to process messages comprises:
program instructions for disconnecting from a connection to a queue manager responsible for forwarding messages from the sender and destined for the receiver.

24. The computer system of claim 14, wherein the first queue manager is associated with multiple receivers.

25. The computer system of claim 24, wherein each receiver has a separate test-point destination selected, each destination providing a test point for providing an indication of whether that specific receiver is active and wherein the first intermediary destination and the second intermediary destination employ the same queue manager configuration.

26. The computer system of claim 14, wherein the program instructions for determining using the first destination whether the receiver is active is performed periodically.

27. A computer program product comprising a tangible computer-readable storage device having encoded thereon program instructions for refraining from processing messages from a sender at a queue manager associated with a receiver when the receiver is inactive, the program instructions comprising:
program instructions for identifying at a receiving queue manager whether a first intermediary destination has been selected as a test-point for indicating the active or non-active status of a message receiver, the first intermediary destination providing an indication of whether the receiver is active;

program instructions for, responsive to identifying that the first intermediary destination has been selected as a test-point, determining at the receiving queue manager, using the first intermediary destination to determine whether the receiver status is active or non-active and not receiving messages by testing over a functioning network connection whether the first intermediary destination is or is not open for input and accepting messages for the receiver or by determining whether the receiver is looking at the first intermediary destination and has the first-intermediary destination in an open status such that messages for the receiver may be gotten from the first intermediary destination;

program instructions for, responsive to determining, by testing over an active and functioning network connection with the first intermediary destination test point, that the receiver is inactive because the first intermediary destination indicates that the receiver is inactive, refusing to process messages at a second intermediary destination, wherein the refused messages at the second intermediary destination are intended for receipt by the receiver.

* * * * *